US009523600B2

(12) United States Patent
Criel et al.

(10) Patent No.: US 9,523,600 B2
(45) Date of Patent: Dec. 20, 2016

(54) GAUGING METHOD FOR A PLASTIC FUEL TANK OF A HYBRID VEHICLE

(71) Applicant: Inergy Automotive Systems Research (Societe Anonyme), Brussels (BE)

(72) Inventors: Bjorn Criel, Sint-Martens-Lennik (BE); Vincent Cuvelier, Wuhan (CN)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 256 days.

(21) Appl. No.: 14/356,734

(22) PCT Filed: Nov. 7, 2012

(86) PCT No.: PCT/EP2012/072065
§ 371 (c)(1),
(2) Date: May 7, 2014

(87) PCT Pub. No.: WO2013/068424
PCT Pub. Date: May 16, 2013

(65) Prior Publication Data
US 2014/0298885 A1    Oct. 9, 2014

(30) Foreign Application Priority Data

Nov. 7, 2011 (EP) .................... 11188033

(51) Int. Cl.
G01F 25/00    (2006.01)
G01F 23/00    (2006.01)

(52) U.S. Cl.
CPC ........... G01F 25/0084 (2013.01); G01F 23/00 (2013.01); G01F 25/0061 (2013.01)

(58) Field of Classification Search
CPC .. G01F 23/0061–23/0092; G01F 23/00–23/76; G01F 25/00; G01F 25/0092
USPC .......................................... 73/1.73, 291–334
See application file for complete search history.

(56) References Cited

U.S. PATENT DOCUMENTS

| 5,425,470 | A  | * | 6/1995  | Duhaime ......... B60K 15/03177 206/0.6 |
| 5,666,851 | A  | * | 9/1997  | Bacon ..................... G01F 23/36 338/33 |
| 7,103,460 | B1 | * | 9/2006  | Breed ................. B60C 23/0408 701/29.1 |
| 7,305,875 | B1 |   | 12/2007 | Pindus et al. |
| 2001/0032507 | A1 | * | 10/2001 | Eck .......................... G01F 23/38 73/317 |
| 2004/0149271 | A1 |   | 8/2004  | Wiesenberger et al. |
| 2007/0233360 | A1 |   | 10/2007 | Hill et al. |
| 2009/0206097 | A1 | * | 8/2009  | Gebert ............. B60K 15/03177 220/653 |
| 2009/0277251 | A1 | * | 11/2009 | Takakura ........... F02M 25/0809 73/40.7 |
| 2010/0212397 | A1 |   | 8/2010  | Kaya |
| 2012/0234074 | A1 | * | 9/2012  | Hagen ...................... G01F 1/32 73/1.73 |

FOREIGN PATENT DOCUMENTS

| DE | 101 09 058 A1 | 9/2002 |
| EP | 2 282 182 A1 | 2/2011 |
| WO | WO 2005/103477 A1 | 11/2005 |
| WO | WO 2009/051571 A1 | 4/2009 |

OTHER PUBLICATIONS

International Search Report issued Mar. 27, 2013, in PCT/EP12/072065 filed Nov. 7, 2012.

* cited by examiner

*Primary Examiner* — Peter Macchiarolo
*Assistant Examiner* — Nathaniel Kolb
(74) *Attorney, Agent, or Firm* — Oblon, McClelland, Maier & Neustadt, L.L.P.

(57) ABSTRACT

A gauging method for a plastic fuel tank mounted on a hybrid vehicle, the tank including a reservoir including a gauge for measuring an amount of fuel in the tank, the method including: measuring the amount of fuel in the tank using the gauge; estimating deformation of the tank using at least one sensor onboard the vehicle; and correcting the amount measured by the gauge based on the estimated deformation.

11 Claims, No Drawings

GAUGING METHOD FOR A PLASTIC FUEL TANK OF A HYBRID VEHICLE

The present invention relates to a gauging method for a fuel tank of a hybrid vehicle.

Vehicles that combine the use of a combustion engine and of an electric motor are generally referred to as hybrid vehicles.

There is a general principle of operation for hybrid vehicles which involves running either the electric motor or the combustion engine or both at the same time depending on the model.

One of the specific principles is as follows:
- during stationary phases (where the vehicle is stationary), both the motor and the engine are switched off;
- on start-up, it is the electric motor that sets the car in motion, up to higher speeds (25 or 30 km/h);
- when higher speeds are reached, the combustion engine takes over;
- under heavy acceleration, both the motor and the engine are operated at the same time, making it possible to achieve accelerations that are equivalent to, or even better than, an engine or motor of the same power;
- during deceleration and braking, the kinetic energy is used to recharge the batteries (note that this functionality is not available on all hybrid motors available on the market at the present time).

As a result of this principle, the combustion engine does not operate constantly and, as a result, the phases of purging the canister (the active-charcoal filter that avoids fuel vapors being released into the atmosphere) cannot be performed in the normal way because during these phases, air, which may be preheated, is circulated through the canister in order to regenerate it (i.e. to desorb the fuel vapors adsorbed therein), this air then being admitted to the engine where it is burnt.

As a result, in order to avoid needlessly charging the canister, the communication between the tank and the canister is generally blocked by default; that means that the fuel tanks of these vehicles are generally placed under pressure (typically at a pressure of the order of 300-400 mbar), this generally being achieved by a functional element situated after the ventilation valves, and often referred to as an FTIV (fuel tank isolation valve) which prevents the ventilation (degassing) of the tank outside of filling situations. This element generally comprises two safety valves (rated at the lower and upper maximum pressures of use of the tank) and a control, generally electrical, so that the tank can be returned to atmospheric pressure prior to filling.

By comparison with their metallic counterparts, tanks (or other parts of the fuel system) made of plastic offer a certain advantage in terms of weight and processability. However, their disadvantage is that non-negligible, sometimes remanent, deformations may be introduced into them following increases/fluctuations in temperature and pressure and as a result of the aging of said tanks. These deformations may lead to a significant error regarding the volume of fuel estimated by conventional gauges on the basis of a measurement of the level of fuel present in the tank.

Now, it is common practice for vehicles to be equipped with temperature, pressure, etc. sensors notably so that leak detection tests (or "OBD (on board diagnosis) leak tests") can be carried out.

The idea underlying the present invention is to use at least one such sensor for estimating the deformation of the tank and for being able to correct the gauged value accordingly.

The present invention therefore relates to a gauging method for a plastic fuel tank mounted on a hybrid vehicle, said tank being equipped with a gauge that allows the volume of fuel present in the tank to be measured, according to which method:
- the volume of fuel present in the tank is measured using the gauge;
- the deformation of the tank is estimated using at least one sensor carried on board the vehicle; and
- the volume measured by the gauge is corrected on the basis of the estimated deformation.

In the context of implementation of the above defined method, a gauging law is obtained by virtue of which the exact volume of fuel present in the tank can be determined. In a first embodiment, this gauging law allows the volume measured by the gauge to be corrected. In other words, the gauging law allows a predetermined correction factor to be applied to the measurement from the gauge. In a second embodiment, this gauging law can be a predetermined mathematical formula/table/curve that is used to determine the volume of fuel in the tank.

A "gauging method" is intended to denote a method for determining the amount (volume) of fuel present in the tank. To do that, the method according to the invention uses a gauge which preferably generates an electrical signal. This gauge may or may not involve a moving part. It may be a gauge with arm and float, a capacitive gauge, etc.

The fuel for which the invention is intended may be gasoline, diesel oil, a biofuel, etc. and may have an alcohol content from 0 to 100%.

The fuel tank according to the invention is made of plastic, i.e. comprises a chamber made of plastic defining a storage volume. This chamber is preferably reinforced, for example by an internal or external fibrous reinforcement, by local welds ("kiss points"), by an attached reinforcing element (sort of pillar) adjoining its upper and lower walls, etc.

Thermoplastics yield good results in the context of the invention, notably because of the advantages of weight, mechanical strength, chemical resistance and good processability, particularly when the elements of the system have complex shapes.

In particular, use may be made of polyolefins, thermoplastic polyesters, polyketones, polyamides and copolymers thereof. A blend of polymers or copolymers may also be used, as may a blend of polymers with inorganic, organic and/or natural fillers, such as, for example but nonlimitingly: carbon, salts and other inorganic derivatives, natural or polymer fibers. It is also possible to use multilayer structures made up of stacked and bonded layers comprising at least one of the polymers or copolymers described above.

One polymer often used for fuel tanks is polyethylene. Excellent results have been obtained with high density polyethylene (PEHD).

For preference, the tank for which the method according to the invention is intended has a multilayer structure comprising at least one layer of thermoplastic and at least one additional layer which may advantageously be made of a material that forms a barrier against liquids and/or gases.

The present invention is well suited to fuel tanks made of PEHD with a barrier layer of EVOH.

The method according to the invention uses at least one sensor to estimate the deformation of the tank. For preference, this is a sensor the measurement (pressure, temperature, time elapsed since a given instant, etc.) of which is used on the vehicle for some function other than gauging, for example for testing the fuel system. For preference, the method according to the invention uses a pressure sensor and/or a temperature sensor and/or a working-life meter. As a quite particular preference, the method according to the invention uses at once a pressure sensor, a temperature sensor and a working-life meter.

The abovementioned sensor or sensors are preferably directly associated with the tank, i.e. the pressure sensor, where appropriate, preferably measures the pressure in the tank, the temperature sensor performing likewise, where appropriate, and the meter preferably measures the time elapsed since the first filling of the tank.

The estimate of the deformation of the tank can be calculated on the basis of experimental measurements and/or numerical simulations. It may involve recourse to calibration tables where deformation values are listed as a function of the parameter or parameters measured, or to calibration curves or formulae allowing the amount of deformation to be read off or calculated as a function of this/these parameter(s). Note that these tables/curves/formulae are generally dependent on other factors such as the shape of the tank, the position of the gauge, etc.

The method according to the invention is generally applied to the fuel system by a processor which may be incorporated into an on-board computer of the vehicle (sometimes referred to as the ECU or engine control unit) or by a processor specific to the fuel system (sometimes referred to as FSCU or fuel system control unit). According to this alternative form of the invention, the abovementioned calibration tables, curves and/or formulae are stored in a memory of the processor and at least one suitable software package uses these to correct the value read by the gauge and to calculate the volume of fuel present in the tank with greater precision.

One preferred design of the electronics might be to connect the sensors present in the tank to the vehicle on-board computer using an electrical network. In addition, the vehicle on-board computer may be broken down into several distinct physical entitites (referred to as computers or controllers). These entities then carry information between them using electrical networks containing analog connections, digital connections or field buses which are multiplexed (in accordance with the CAN, LIN, Flexray, etc. standards). Thus, all of the calculation aimed at improving the precision of the gauging can be spread over several intercommunicating entities.

The invention claimed is:

1. A gauging method for a plastic fuel tank mounted on a hybrid vehicle, the tank including a gauge that allows a volume of fuel present in the tank to be measured, the method comprising:

measuring the volume of fuel present in the tank using the gauge;

estimating a deformation of the tank using at least one on-board sensor carried on board the vehicle, the at least one on-board sensor including a working-life meter; and correcting the volume measured by the gauge based on the estimated deformation.

2. The method as claimed in claim 1, wherein the tank is made of PEHD or high density polyethylene and includes a barrier layer of EVOH or ethylene vinyl alcohol copolymer.

3. The method as claimed in claim 1, wherein the at least one on-board sensor is also used on the vehicle for a function other than gauging, or is used for testing a fuel system.

4. The method as claimed in claim 1, further using a pressure sensor or a temperature sensor.

5. The method as claimed in claim 4, using at once a pressure sensor, a temperature sensor, and the working-life meter.

6. The method as claimed in claim 1, wherein the at least one on-board sensor is associated with the fuel tank.

7. The method as claimed in claim 1, using calibration tables, and/or curves, and/or formulae obtained by experimental measurement and/or numerical simulation.

8. The method as claimed in claim 7, applied to the fuel system by a processor that may be incorporated into an on-board computer of the vehicle or by a processor specific to the fuel system.

9. The method as claimed in claim 8, wherein the calibration tables, curves, and/or formulae are stored in a memory of the processor and at least one software package uses these to correct a value read by the gauge and to calculate the volume of fuel present in the tank.

10. The method as claimed in claim 8, wherein the tank includes plural sensors, and wherein the plural sensors are connected to the vehicle on-board computer using an electrical network.

11. The method as claimed in claim 10, wherein the vehicle on-board computer includes plural distinct physical entities carrying information between them using electrical networks containing analog connections, digital connections, or field buses that are multiplexed.

* * * * *